United States Patent Office 2,757,083
Patented July 31, 1956

2,757,083
METHOD OF MAKING A METAL ALLOY

Edward B. Story, Bethel, Pa., assignor to A. M. Byers Company, Pittsburgh, Pa., a corporation of Pennsylvania No Drawing. Application August 31, 1953,
Serial No. 377,697

5 Claims. (Cl. 75—133)

This invention relates to a method of making a metal alloy. It relates more particularly to a method of making a metal alloy employing a compound of an alloying metal to be alloyed with basis metal and basis metal which is reducing toward the compound.

For purposes of explanation and illustration the invention will be described in connection with the use of nickel-bearing iron ore in the making of an iron-nickel alloy. However ore containing compounds of other metals such, for example, as copper and molybdenum, may be employed. Oxides or salts of metals such as nickel, copper or molybdenum may be used.

Iron ores are found in Cuba and elsewhere which contain small percentages of nickel, as, for example, one to two per cent, or slightly more. I charge such ore into a suitable furnace, as, for example, a rotary melting furnace, and bring the ore to molten condition. The molten ore is in the nature of a molten iron silicate slag containing nickel oxide. I preferably remove the slag from the furnace into a receptacle.

I separately prepare molten basis metal which is reducing toward the compound of alloying metal in the slag. For example, when the slag contains nickel oxide the basis metal may be ferrous metal. The ferrous metal when prepared may be molten pig iron or other unrefined ferrous metal or the metal may be refined to some extent, as, for example, by bessemerizing or in an open hearth or electric furnace.

I admix the molten slag and the molten basis metal and regulate the temperatures of the molten slag and the molten basis metal so that upon such admixing the basis metal is transformed from molten state into a mass of comminuted particles thereby presenting great surface area to the molten slag for effective reduction of the compound and the compound is reduced and the alloying metal deposits on such particles. When the compound is nickel oxide and the basis metal is ferrous metal the nickel oxide is reduced and the nickel in metallic form deposits on the particles of ferrous metal. The product is what may be termed a non-homogeneous alloy consisting largely of minute particles of basis metal covered with alloying metal.

I find it highly advantageous to effect the admixing of the molten slag containing a substantial amount of a compound of an alloying metal to be alloyed with basis metal and molten basis metal which is reducing toward the compound by pouring the molten basis metal into the molten slag. When this is done and the temperatures of the molten slag and the molten basis metal are regulated in accordance with my invention the basis metal is as mentioned above transformed from molten state into a mass of comminuted particles which present great surface area to the molten slag. I thus create the condition most effectively promoting reduction of the compound. I believe that the compound is largely reduced after the basis metal has been transformed from molten state into the aforementioned mass of comminuted particles as I have found that a compound of the character employed can be reduced by appropriate basis metal at high temperature even though the basis metal is not molten provided that the slag containing the compound is maintained in molten condition. For example, I have found that iron at a temperature of 2200° F. in the form of a mass of comminuted particles will effectively reduce nickel oxide.

The method which I employ is similar to the Aston process of making wrought iron insofar as the comminuting of the metal is concerned. In the Aston process of making wrought iron molten ferrous metal is admixed with molten iron silicate slag in a receptacle whereby the molten ferrous metal is comminuted and the particles of comminuted metal weld together in the bottom of the receptacle to form a wrought iron sponge which is separated from the excess slag, pressed into a bloom and rolled. According to my present invention I utilize the comminuted metal for the new purpose of reducing a compound of an alloying metal and presenting great surface area to the reduced alloying metal so that the alloying metal will deposit on the particles of basis metal. The product may be employed in a steel making process to produce alloy steel. For example, the product may be charged into an open hearth or other steel making furnace and there melted and refined to produce alloy steel. As mentioned above the alloy formed when the alloying metal deposits on the particles of basis metal according to my invention is a non-homogeneous alloy which may be considered as being somewhat in the nature of an admixture of basis metal and alloying metal requiring remelting and/or refining to produce a homogeneous product.

After the admixing of the compound of an alloying metal to be alloyed with basis metal and molten basis metal which is reducing toward the compound as above described the mass of comminuted particles of basis metal having alloying metal deposited thereon is separated from the remaining molten slag. This may conveniently be done by pouring off the remaining molten slag, retaining the comminuted metal in the receptacle.

If the material from which the slag is made contains a large proportion of ferric oxide, as is characteristic of most ores, I preferably during the melting step reduce the ferric oxide to ferrous oxide, thereby materially lowering the melting point. The reduction of the ferric oxide to ferrous oxide also greatly increases the efficiency of the subsequent comminuting step since molten basis metal is not consumed in reducing ferric oxide to ferrous oxide as it would be if the slag contained ferric oxide.

To give an example of my process, I prepare molten slag at a temperature of 2300–2400° F., reducing most of the ferric oxide to ferrous oxide during the melting step by the addition of an appropriate amount of carbon or other suitable material. The melting point of the slag may be about 2300° F. I separately prepare molten ferrous metal at 2900–3000° F., which ferrous metal may having a melting point of in the neighborhood of 2750° F., considering ferrous metal having a carbon content of .10–.15%. The molten slag is disposed in the lower portion of a receptacle and the molten metal is poured in. The amount of slag in the receptacle may, for example, be fifty thousand pounds; it may be made out of Cuban or containing 1½% nickel. I may admix the ferrous metal with the slag by pouring seven thousand five hundred pounds of molten ferrous metal into the fifty thousand pounds of molten slag. The ferrous metal is comminuted as above explained and produces about seven thousand five hundred pounds of iron-nickel alloy containing approximately 10% nickel.

While I have described a present preferred method of practicing the invention it is to be distinctly understood that the invention is not limited thereto but may be otherwise variously practiced within the scope of the following claims.

I claim:

1. A method of making a metal alloy comprising admixing a molten slag containing a substantial amount of a compound of an alloying metal to be alloyed with basis metal and molten basis metal which is reducing toward the compound, regulating the temperatures of the molten slag and the molten basis metal so that upon such admixing the basis metal is transformed from molten state into a mass of comminuted particles thereby presenting great surface area to the molten slag for effective reduction of the compound and the compound is reduced and the alloying metal deposits on such particles and separating the mass of comminuted particles from the remaining molten slag.

2. A method of making an iron-nickel alloy comprising admixing a molten slag containing a substantial amount of a nickel compound and molten ferrous metal, regulating the temperatures of the molten slag and the molten ferrous metal so that upon such admixing the ferrous metal is transformed from molten state into a mass of comminuted particles thereby presenting great surface area to the molten slag for effective reduction of the compound and the compound is reduced and the nickel deposits on such particles and separating the mass of comminuted particles from the remaining molten slag.

3. A method of making a metal alloy comprising pouring into a bath of molten slag containing a substantial amount of a compound of an alloying metal to be alloyed with basis metal and molten basis metal which is reducing toward the compound, regulating the temperatures of the molten slag and the molten basis metal so that upon the pouring of the molten basis metal into the molten slag the basis metal is transformed from molten state into a mass of comminuted particles thereby presenting great surface area to the molten slag for effective reduction of the compound and the compound is reduced and the alloying metal deposits on such particles and separating the mass of comminuted particles from the remaining molten slag.

4. A method of making a material for employment in a steel making process to produce alloy steel comprising admixing in a receptacle a molten slag containing a substantial amount of a compound of an alloying metal to be alloyed with basis metal and molten basis metal which is reducing toward the compound, regulating the temperatures of the molten slag and the molten basis metal so that upon such admixing the basis metal is transformed from molten state into a mass of comminuted particles thereby presenting great surface area to the molten slag for effective reduction of the compound and the compound is reduced and the alloying metal deposits on such particles and removing the remaining molten slag from the receptacle.

5. A method of making a material for employment in a steel making process to produce nickel alloy steel comprising admixing a molten slag containing a substantial amount of nickel oxide and molten ferrous metal, regulating the temperatures of the molten slag and the molten ferrous metal so that upon such admixing the ferrous metal is transformed from molten state into a mass of comminuted particles thereby presenting great surface area to the molten slag for effective reduction of the nickel oxide and the nickel oxide is reduced and the nickel deposits on such particles and separating the mass of ferrous metal particles with nickel deposited thereon from the remaining molten slag.

References Cited in the file of this patent

UNITED STATES PATENTS

| | | |
|---|---|---|
| 1,469,373 | Aston | Apr. 18, 1922 |
| 2,100,265 | Perrin | Nov. 23, 1937 |
| 2,157,979 | Cooper et al. | May 9, 1939 |